(12) United States Patent
McCoy, Jr.

(10) Patent No.: US 10,536,050 B1
(45) Date of Patent: Jan. 14, 2020

(54) ELECTRIC MOTOR MOUNT

(71) Applicant: LTA Distributing, Millsboro, DE (US)

(72) Inventor: Donald Andrew McCoy, Jr., Millsboro, DE (US)

(73) Assignee: LTA Distributing, Millsboro, DE (US)

( * ) Notice: Subject to any disclaimer, the term of this patent is extended or adjusted under 35 U.S.C. 154(b) by 0 days.

(21) Appl. No.: 16/142,980

(22) Filed: Sep. 26, 2018

(51) Int. Cl.
  *F16M 11/00* (2006.01)
  *H02K 5/26* (2006.01)
  *A22C 21/00* (2006.01)
  *A22C 21/02* (2006.01)
  *F16M 7/00* (2006.01)

(52) U.S. Cl.
  CPC ............ *H02K 5/26* (2013.01); *A22C 21/0053* (2013.01); *A22C 21/02* (2013.01); *F16M 7/00* (2013.01)

(58) Field of Classification Search
  CPC ............... F16M 5/00; F16M 7/00; H02K 5/26
  See application file for complete search history.

(56) References Cited

U.S. PATENT DOCUMENTS

| 1,942,834 | A | * | 1/1934 | Railley | H02K 5/26 144/48.7 |
| 2,911,700 | A | * | 11/1959 | Wieland | H02K 5/26 248/310 |
| 3,306,601 | A | * | 2/1967 | Mitchell | B25H 1/0007 269/50 |
| 3,851,857 | A | * | 12/1974 | Notgrass | B25B 27/0035 254/134 |

* cited by examiner

*Primary Examiner* — Amy J. Sterling
(74) *Attorney, Agent, or Firm* — Mile & Stockbridge P.C.

(57) ABSTRACT

An electric motor mount and an electric motor mount system are provided. The electric motor mount includes a frame, a baseplate and a latch. The frame includes two arms, each having a bushing. The baseplate receives an electric motor foot plate, and may be removably attached to the frame in two different orientations. The latch is attached to an end of the frame, and secures the electric motor foot plate to the baseplate. One orientation of the baseplate allows the electric motor to be attached to one side of the electric motor mount, while the other orientation allows the electric motor to be attached to the other side of the electric motor mount. The electric motor mount system includes a mounting bracket and an electric motor mount.

12 Claims, 16 Drawing Sheets

ELECTRIC MOTOR MOUNT

TECHNICAL FIELD

The present invention relates to a mount. More particularly, the present invention relates to a mount for an electric motor.

BACKGROUND

Many industrial machines use electric motors to power tools that operate on work pieces. In the poultry industry, a picker (plucker) removes the feathers from birds as they pass through the picker on a conveyer system. Electric motors, mounted at each end of the picker cabinet, are coupled to drive belts, pulleys, tensioners, etc. to power the de-feathering tools within the picker cabinet. Due to various factors, such as, for example, loading, environmental conditions, etc., the electric motors are frequently replaced. Unfortunately, each electric motor must be properly aligned before it is bolted directly to a mounting bracket on the picker cabinet, which makes replacing the heavy electric motors cumbersome, awkward and inefficient. These deficiencies are also present in other industries that use electric motors, drive belts, pulleys, tensioners, etc. to power work piece tools.

SUMMARY

Embodiments of the present invention provide an electric motor mount and an electric motor mount system.

In one embodiment, an electric motor mount includes a frame, a baseplate and a latch. The frame includes two arms, each having a bushing. The baseplate receives an electric motor foot plate, and may be removably attached to the frame in two different orientations. The latch is attached to an end of the frame, and secures the electric motor foot plate to the baseplate. One orientation of the baseplate allows the electric motor to be attached to one side of the electric motor mount, while the other orientation allows the electric motor to be attached to the other side of the electric motor mount.

In another embodiment, an electric motor mount system includes a mounting bracket and an electric motor mount.

BRIEF DESCRIPTION OF THE DRAWINGS

FIG. 9A is a left side view of the electric motor mount depicted in FIG. 3, while

FIG. 10A is a right side view of the electric motor mount depicted in FIG. 3, while

FIG. 16A depicts a latch of the electric motor mount depicted in FIG. 13 in an open position, while

DETAILED DESCRIPTION

Figure 1A:
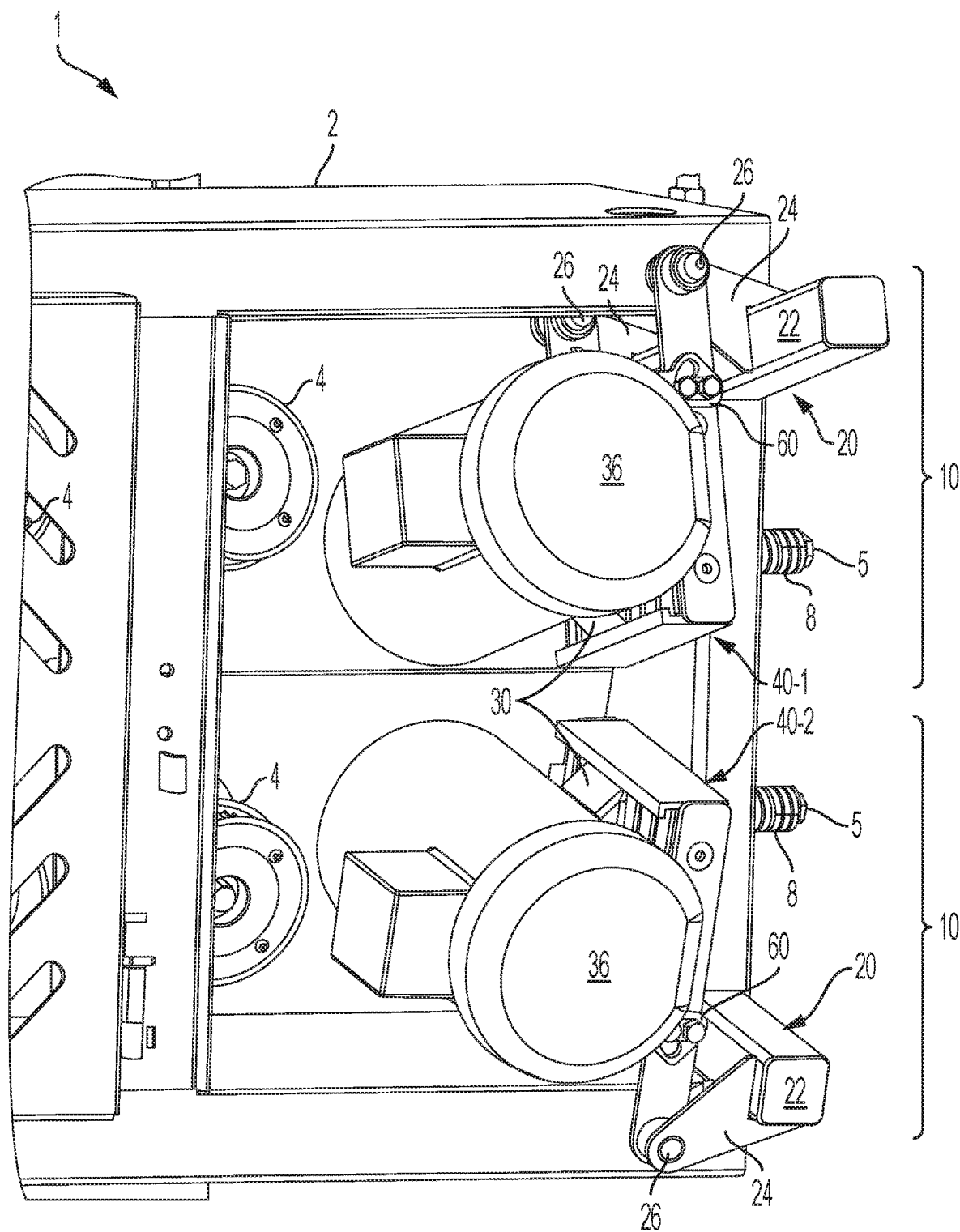
FIGS. 1A and 1B depict an electric motor mount system, in accordance with an embodiment of the present invention.

The invention will now be described with reference to the drawing figures, in which like reference numerals refer to like parts throughout.

Embodiments of the present invention advantageously provide an electric motor mount and an electric motor mount system.

In one embodiment, an electric motor mount includes a frame, a baseplate and a latch. The frame includes two arms, each having a bushing. The baseplate receives an electric motor foot plate, and may be removably attached to the frame in two different orientations. The latch is attached to an end of the frame, and secures the electric motor foot plate to the baseplate. One orientation of the baseplate allows the electric motor to be attached to one side of the electric motor mount, while the other orientation allows the electric motor to be attached to the other side of the electric motor mount.

In another embodiment, an electric motor mount system includes a mounting bracket and an electric motor mount. The mounting bracket includes a tubular member and two support arms, each having a rotational coupling. The electric motor mount includes a frame, a baseplate and a latch. The frame includes two arms, each having a bushing. The baseplate receives an electric motor foot plate, and may be removably attached to the frame in two different orientations. The latch is attached to an end of the frame, and secures the electric motor foot plate to the baseplate. One orientation of the baseplate allows the electric motor to be attached to one side of the electric motor mount, while the other orientation allows the electric motor to be attached to the other side of the electric motor mount.

Figure 1B:
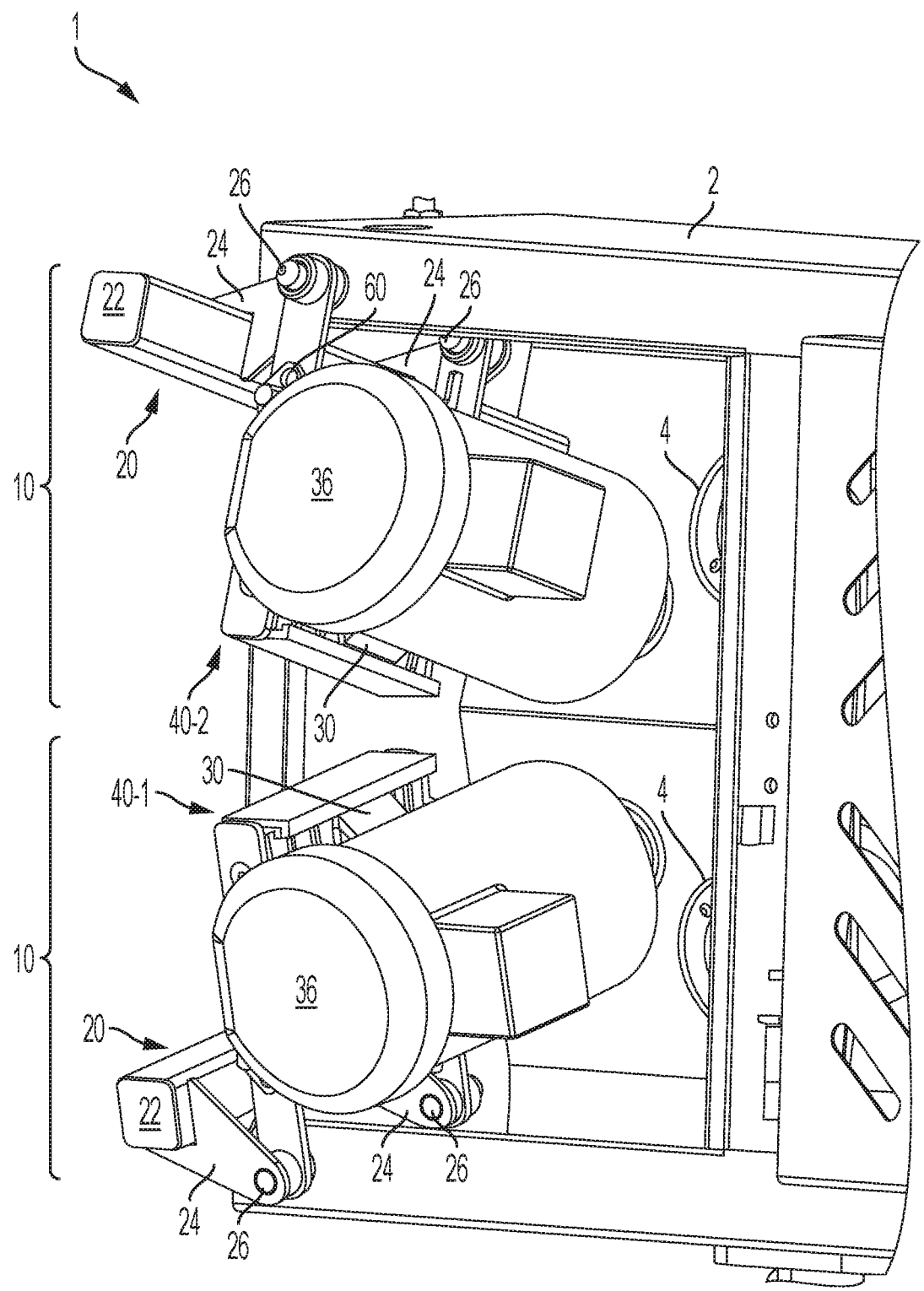
Figure 2:
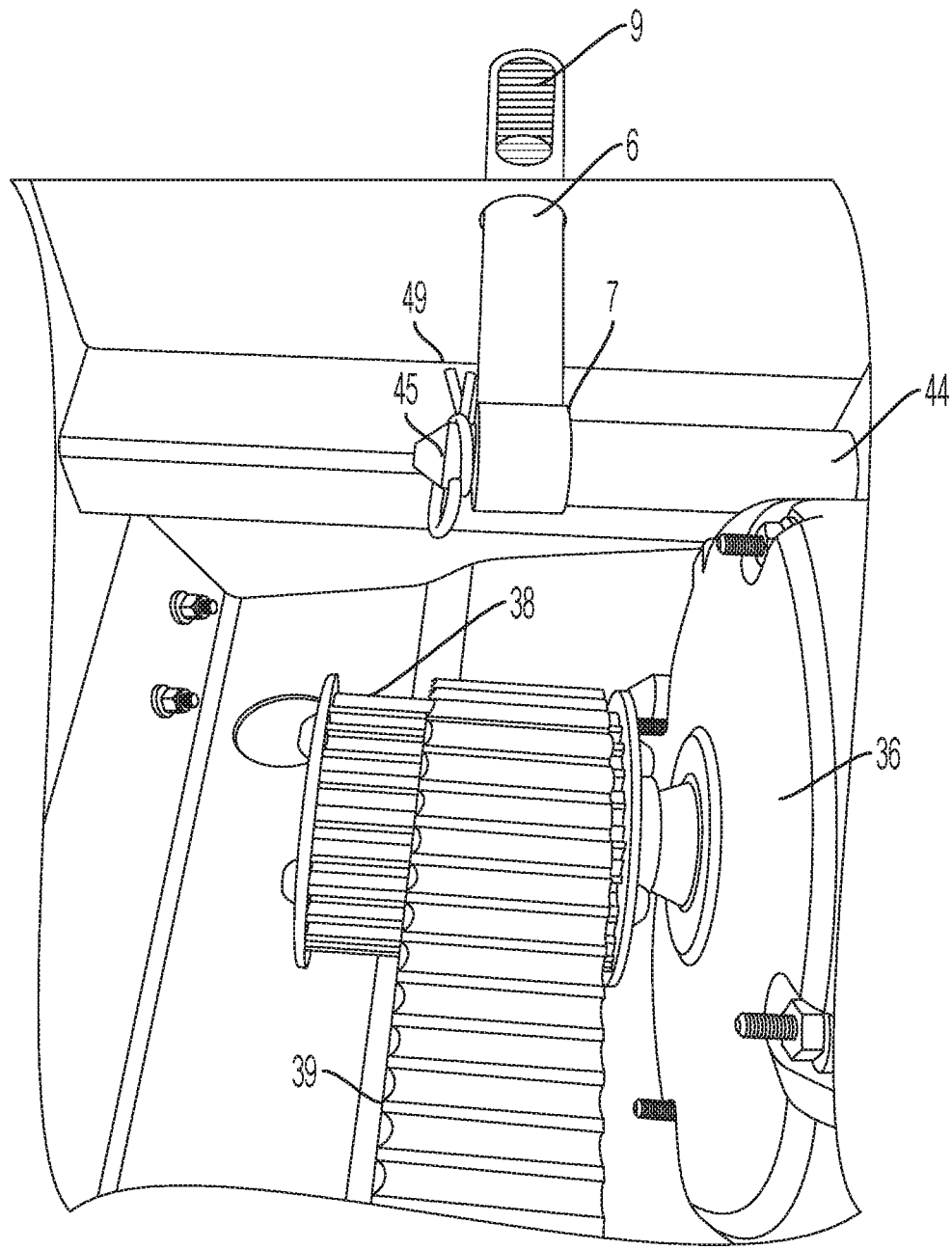
FIG. 2 depicts a partial view of a front end of the electric motor mount system depicted in FIG. 1.

FIGS. 1A and 1B depict an electric motor mount system, in accordance with an embodiment of the present invention. FIG. 2 depicts a partial view of a front end of the electric motor mount system depicted in FIG. 1.

Industrial machine 1 may be any machine that uses electric motors, drive belts, pulleys, tensioners, etc. to power work piece tools. For example, industrial machine 1 may be a picker (plucker) used in the poultry industry. Industrial machine 1 includes, inter alia, cabinet 2, pulleys 4, alignment bolts 5, alignment rods 6, and tension springs 8. Each alignment rod 6 has engagement portion 7 on one end, and internal threads 9 on the other end. Electric motor mount system 10 is attached to cabinet 2, and provides mounting locations for electric motors 36. Each electric motor 36 includes a foot plate 30, which is typically welded to the electric motor housing. A drive pulley 38 is attached to the each electric motor shaft, which drives belt 39, which may be a timing belt, a v-belt, etc. Electric motors 36 are connected to an electrical power source and a control panel, computer system, etc. (not shown). The interior configuration of cabinet 2 is not shown.

Electric motor mount system 10 includes mounting bracket 20 and electric motor mount 40-1 or electric motor mount 40-2. Mounting bracket 20 includes tubular member 22 and two support arms 24, each having a rotational coupling 26, such as, for example, a steel pin, shaft, etc. Generally, tubular members 22 and support arms 24 are made from steel, although other metals or alloys may also be used.

Electric motor mounts 40-1, 40-2 include frame 42, baseplate 50 and latch 60. Generally, frame 42, baseplate 50 and latch 60 are made from steel, although other metals or alloys may also be used. As depicted in FIGS. 1A and 1B, electric motor mounts 40-1, 40-2 may be attached to mounting bracket 20 in a normal position (depending) or an inverted (upright) position. In the normal position, electric motor mounts 40-1, 40-2 depend or hang from mounting bracket 20. Electric motor mount 40-1 in FIG. 1A and electric motor mount 40-2 in FIG. 1B are attached to mounting bracket 20 in the normal position. In the inverted position, electric motor mounts 40-1, 40-2 are supported in an upright position by mounting bracket 20. Electric motor mount 40-2 in FIG. 1A and electric motor mount 40-1 in FIG. 1B are attached to mounting bracket 20 in the inverted position.

Figure 3:
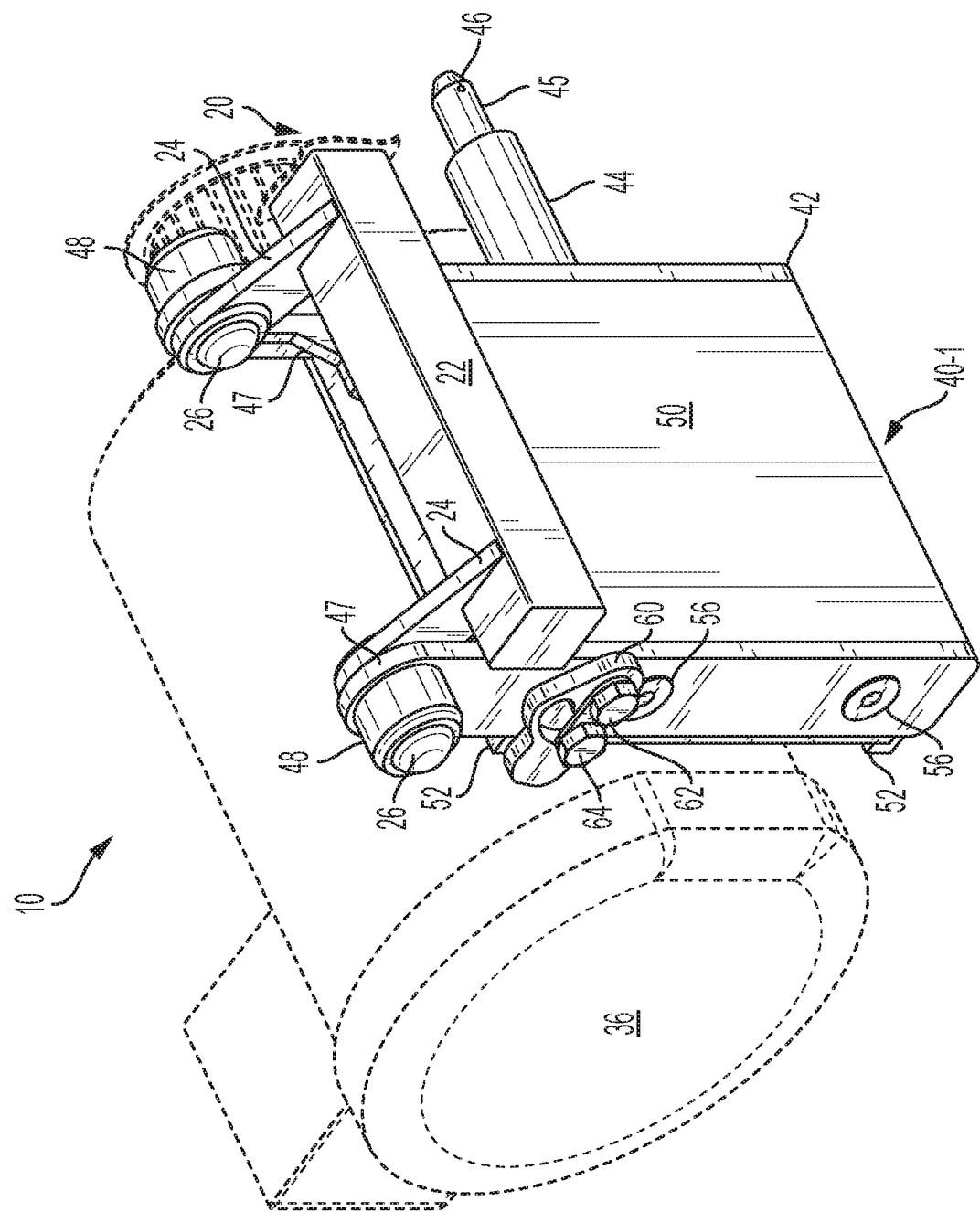
FIG. 3 is a perspective view of an electric motor mount and an electric motor in a mounted configuration, in accordance with an embodiment of the present invention.
Figure 4:
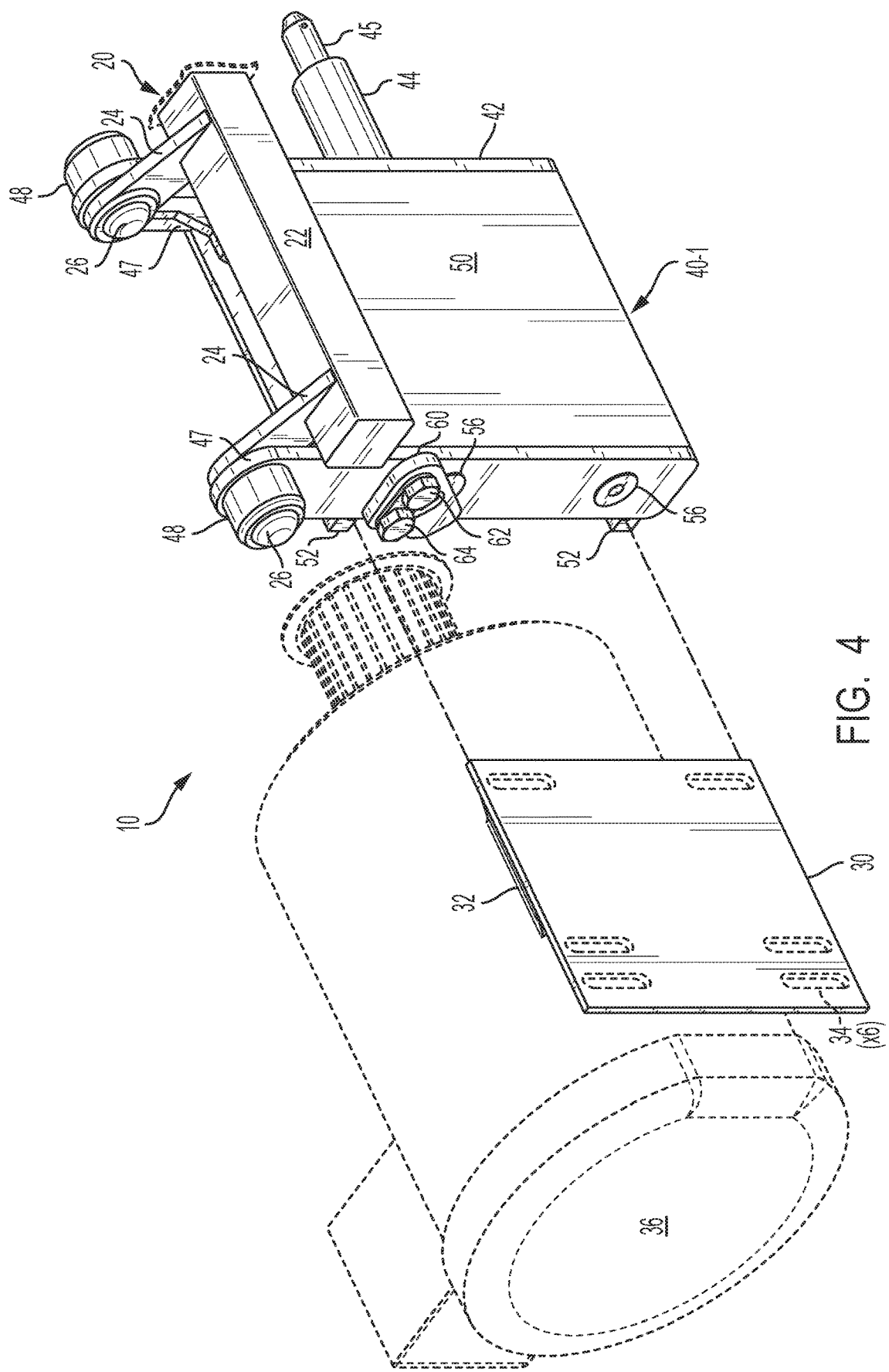
FIG. 4 is a perspective view of the electric motor mount and the electric motor depicted in FIG. 3 in an un-mounted configuration.

FIG. 3 is a perspective view of an electric motor mount and an electric motor in a mounted configuration, in accordance with an embodiment of the present invention. FIG. 4 is a perspective view of the electric motor mount and the electric motor depicted in FIG. 3 in an un-mounted configuration. Electric motor 36 is shown in broken line for clarity.

Electric motor mount 40-1 includes frame 42, baseplate 50 and latch 60. Frame 42 includes two arms 47, each having a bushing 48 that cooperates with rotational couplings 26 to attach electric motor mount 40-1 to support arms 24 of mounting bracket 20. Baseplate 50 receives electric motor foot plate 30, and is removably attached to frame 42 in a one of two different orientations. Latch 60 is attached to the back end of frame 42, and secures electric motor foot plate 30 to baseplate 50. Latch bolt 62 allows latch 60 to pivot, while bolt 64 cooperates with cutaway portion of latch 60 to secure latch 60 in an open or closed position. Latch 60 is depicted in the closed position in FIG. 3, and in the open position in FIG. 4.

One orientation of baseplate 50 allows electric motor 36 to be attached to one side of electric motor mount 40-1, as depicted in FIGS. 1A, 1B, 3, 4, 5, 6, 9A, and 10A. The other orientation of baseplate 50 allows electric motor 36 to be attached to the other side of electric motor mount 40-2, as depicted in FIGS. 1A, 1B, 13, 14, 15, 16A and 16B. In other words, one orientation presents guide rails 52 and guide stops 54 on one side of frame 42, and the other orientation presents guide rails 52 and guide stops 54 on the other side of frame 42.

Figure 15:
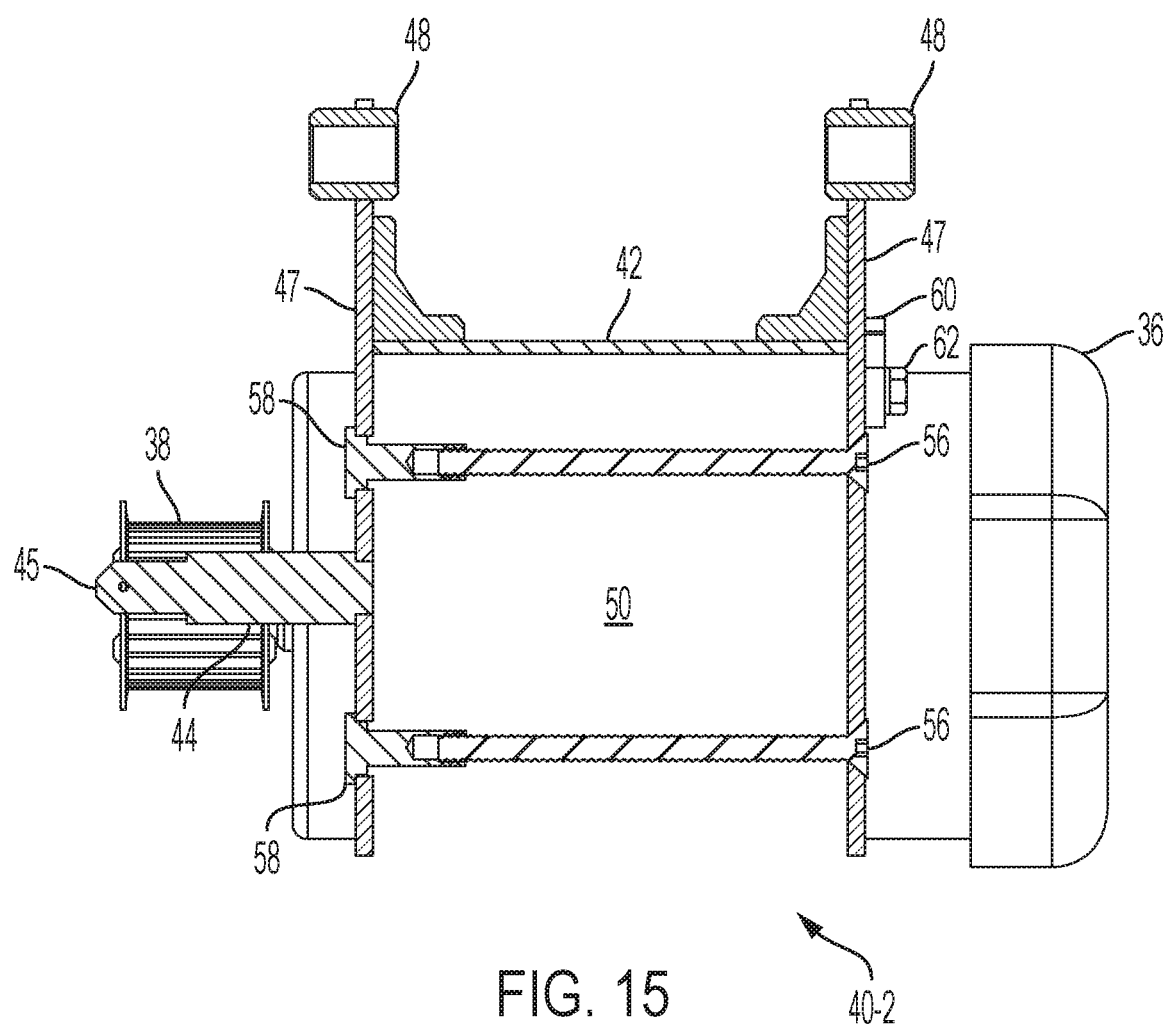
FIG. 15 is a sectional view of the electric motor mount depicted in FIG. 13.

Generally, one or more mechanical fasteners attach baseplate 50 to electric motor mounts 40-1, 40-2. As depicted in FIG. 15, two bolts 56 pass through baseplate 50 and are secured using nuts 58. In another example, a single bolt 56 may pass through baseplate 50 and may be secured using a single nut 58. In a further example, baseplate 50 may include two threaded holes or embedded nuts (not shown) on each side to receive four bolts (not shown). In this example, the bolts do not pass through baseplate 50. Other numbers of bolts and threaded holes or embedded nuts may also be used, such as, for example, two bolts, six bolts, eight bolts, etc.

Alignment shaft 44 extends from the front end of frame 42, and includes alignment shaft engagement portion 45 and pin hole 46. Alignment rod engagement portion 7 engages alignment shaft engagement portion 45, and pin 49 prevents alignment shaft 44 from disengaging alignment rod 6 (depicted in FIG. 2). Alignment bolt 5 engages internal threads 9 of alignment rod 6 to compress tension spring 8 against cabinet 2 to control the position of alignment rod 6. Because alignment rod 6 engages alignment shaft 44, electric motor mount 40-1, 40-2 rotates about rotational couplings 26 when the position of alignment rod 6 is adjusted. And, because drive pulley 38 rotates when electric motor mount 40-1 or electric motor mount 40-2 rotates, the tension of belt 39 is adjusted by simply tightening or loosening alignment bolt 5.

Figure 14:
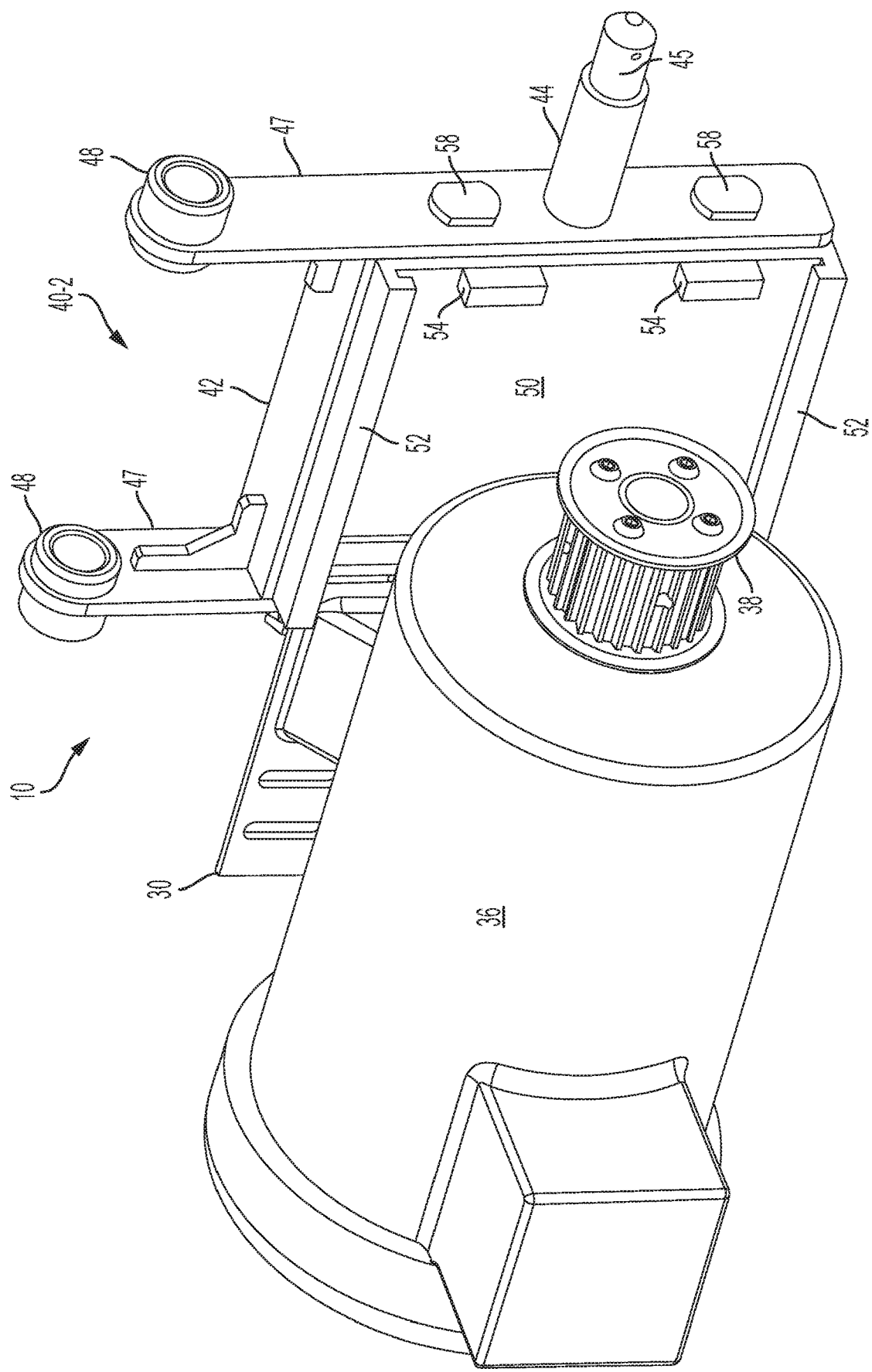
FIG. 14 is a perspective view of the electric motor mount and the electric motor depicted in FIG. 13 in a partially-mounted configuration.

Initially, electric motor mounts 40-1, 40-2 are attached to mounting bracket 20, using rotational coupling 26, and alignment rod 6 is connected to alignment shaft 44. To mount electric motor 36 to electric motor mount 40-1 or 40-2, latch 60 is moved to its open position, electric motor foot plate 30 is inserted into (and slid along) guide rails 52 until the forward edge of electric motor foot plate 30 abuts guide stops 54. Latch 60 is then moved to its closed position, which secures electric motor foot plate 30 (and electric motor 36) to baseplate 50. Belt 39 is then attached to drive pulley 38. FIG. 4 depicts an un-mounted electric motor 36 with electric motor mount 40-1, while FIG. 14 depicts a partially-mounted electric motor 36 within electric motor mount 40-2.

Figure 5:
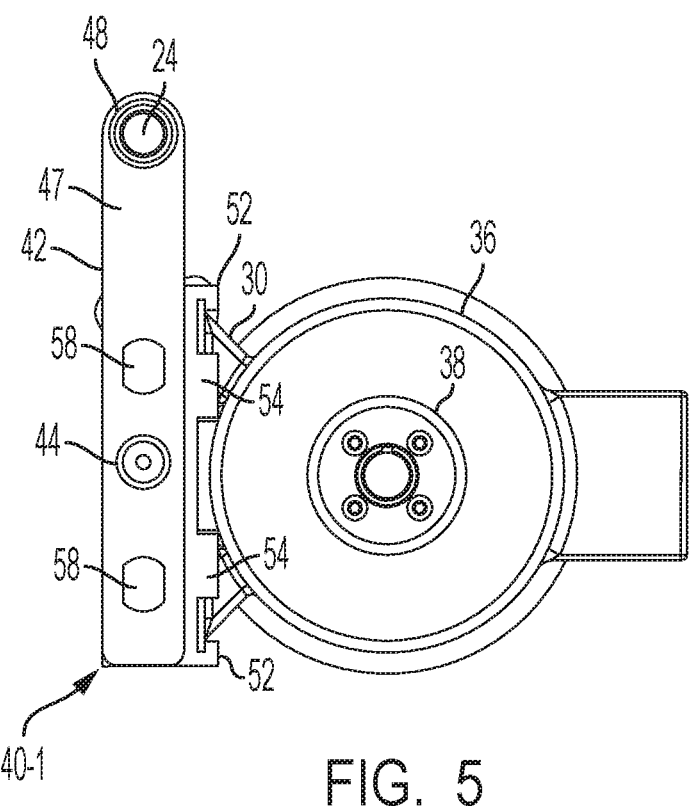
FIG. 5 is a front view of the electric motor mount and electric motor depicted in FIG. 3.
Figure 6:
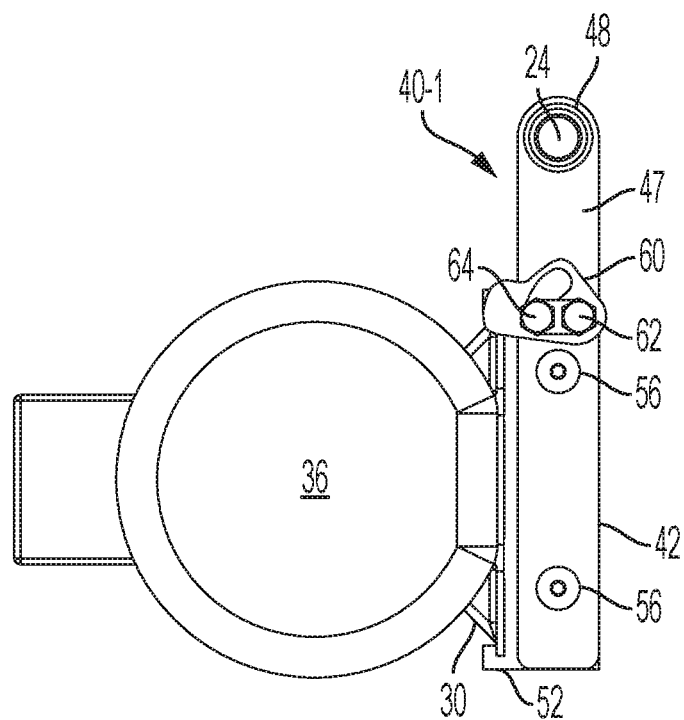
FIG. 6 is a rear view of the electric motor mount and electric motor depicted in FIG. 3.

FIG. 5 is a front view of the electric motor mount and electric motor depicted in FIG. 3, while FIG. 6 is a rear view of the electric motor mount and electric motor depicted in FIG. 3.

Guide rails 52 and guide stops 54 cooperate with latch 60, in its closed position, to secure electric motor 36 to baseplate 50. Guide rails 52 are generally parallel and cooperate with a rectangular or square shaped electric motor foot plate 30. Other electric motor foot plate 30 shapes may also be accommodated, such as triangular, angled, curved, etc. While two guide stops 54 are depicted, one guide stop 54 may be used. Alternatively, guide stops 54 may be formed as rails, similar to guide rails 52.

Figure 7:
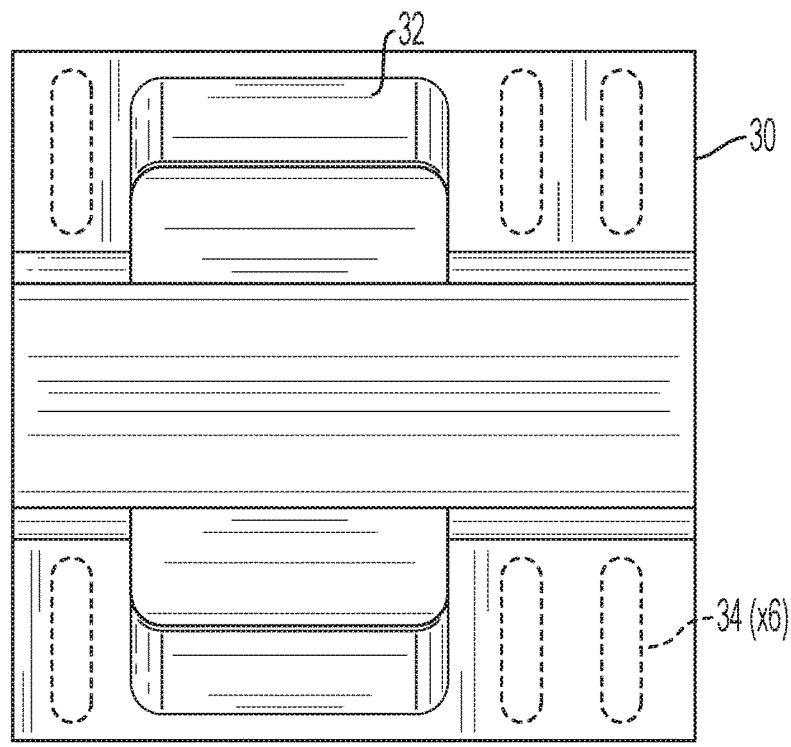
FIG. 7 is a left side view of the electric motor foot plate depicted in FIG. 4.
Figure 8:
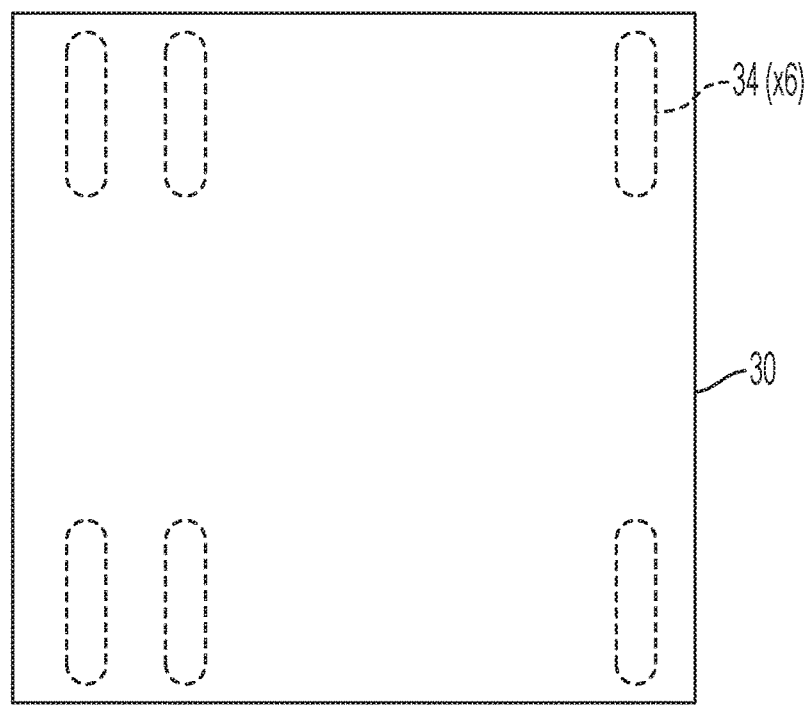
FIG. 8 is a right side view of the electric motor foot plate depicted in FIG. 4.

FIG. 7 is a left side view of the electric motor foot plate depicted in FIG. 4, while FIG. 8 is a right side view of the electric motor foot plate depicted in FIG. 4.

Electric motor foot plate 30 is typically attached (welded, etc.) to electric motor 36 by the electric motor manufacturer. Electric motor foot plate 30 typically has a square or rectangular shape, and includes electric motor cradle 32. Other electric motor foot plate 30 shapes may also be accommodated, such as triangular, angled, curved, etc. Optional lightening or bolt holes may be also included by the manufacturer.

Figure 9A:
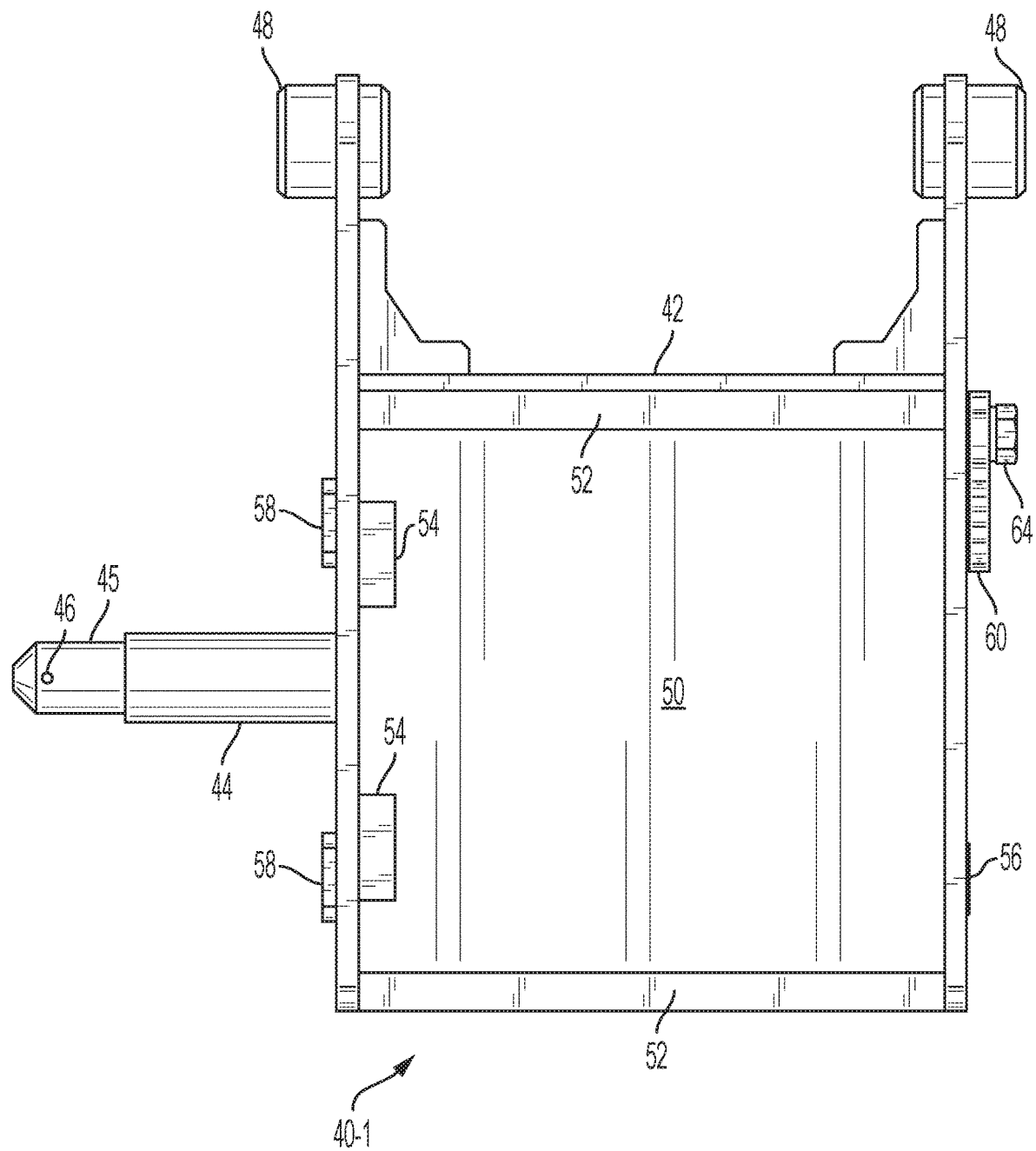
Figure 9B:
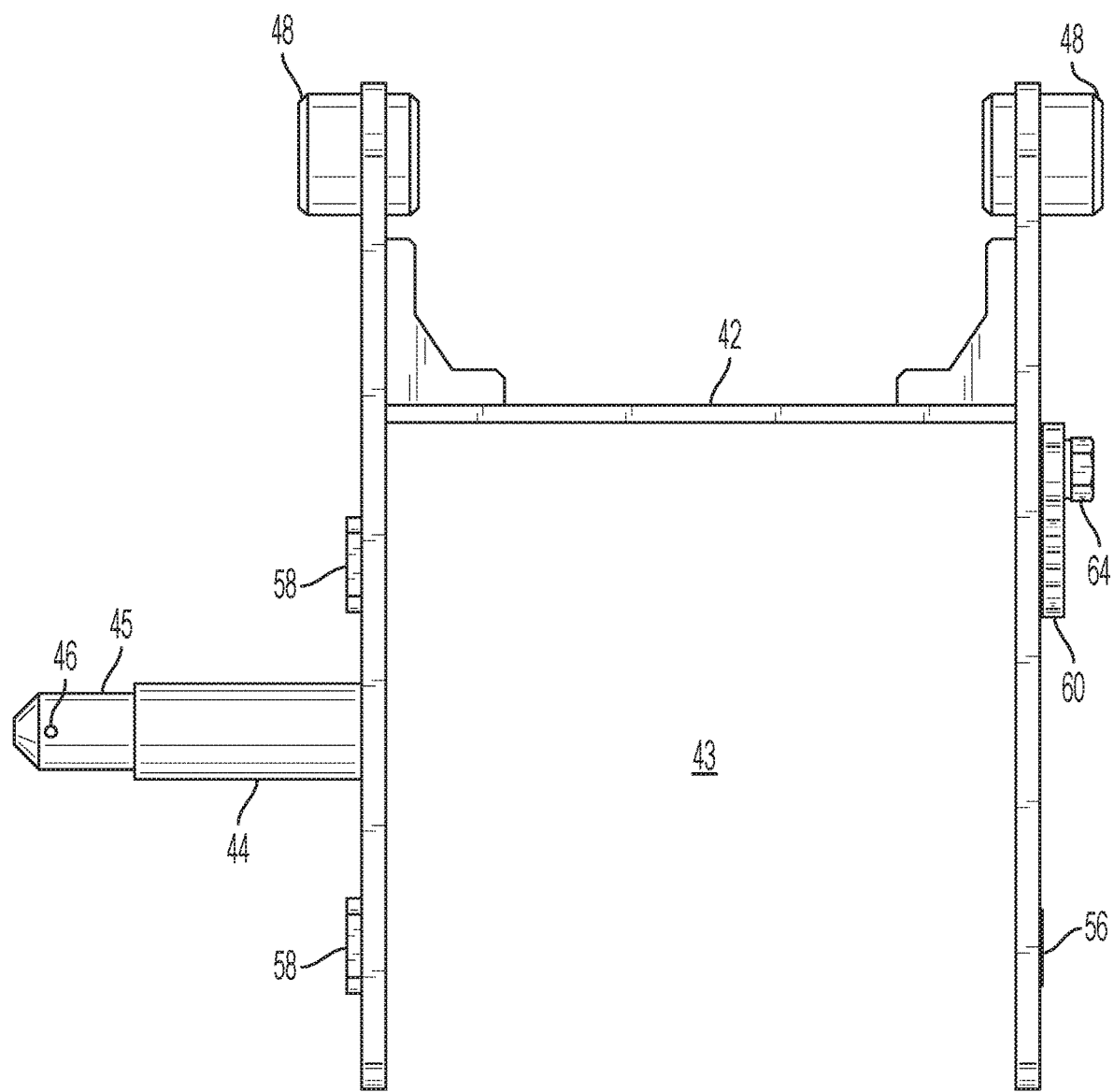
FIG. 9B is a left side view of the electric motor mount depicted in FIG. 3 without a baseplate.

FIG. 9A is a left side view of the electric motor mount depicted in FIG. 3, while FIG. 9B is a left side view of the electric motor mount depicted in FIG. 3 without a baseplate.

Figure 10A:
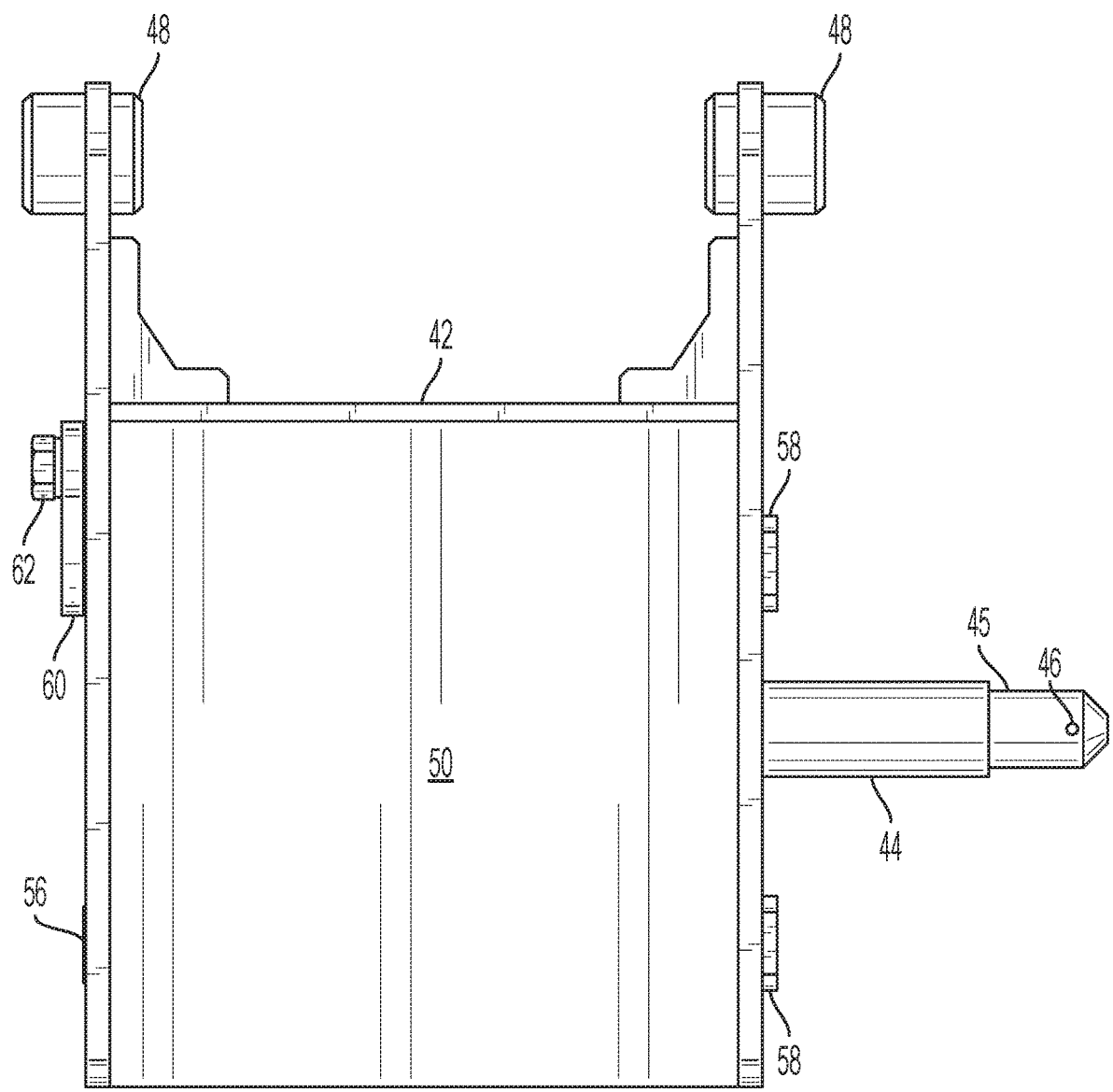
Figure 10B:
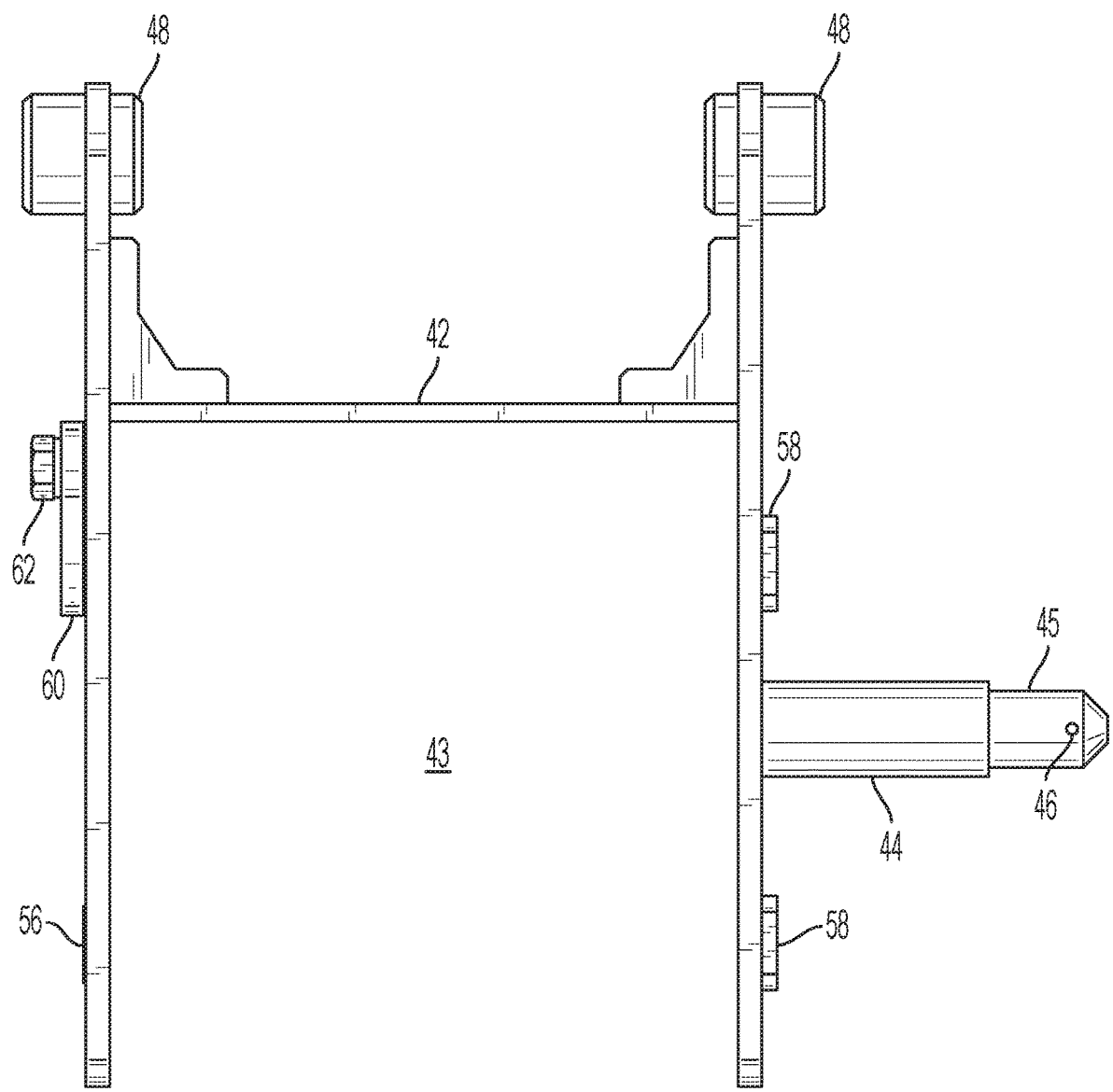
FIG. 10B is a right side view of the electric motor mount depicted in FIG. 3 without a baseplate.

FIG. 10A is a right side view of the electric motor mount depicted in FIG. 3, while FIG. 10B is a right side view of the electric motor mount depicted in FIG. 3 without a baseplate.

Figure 11:
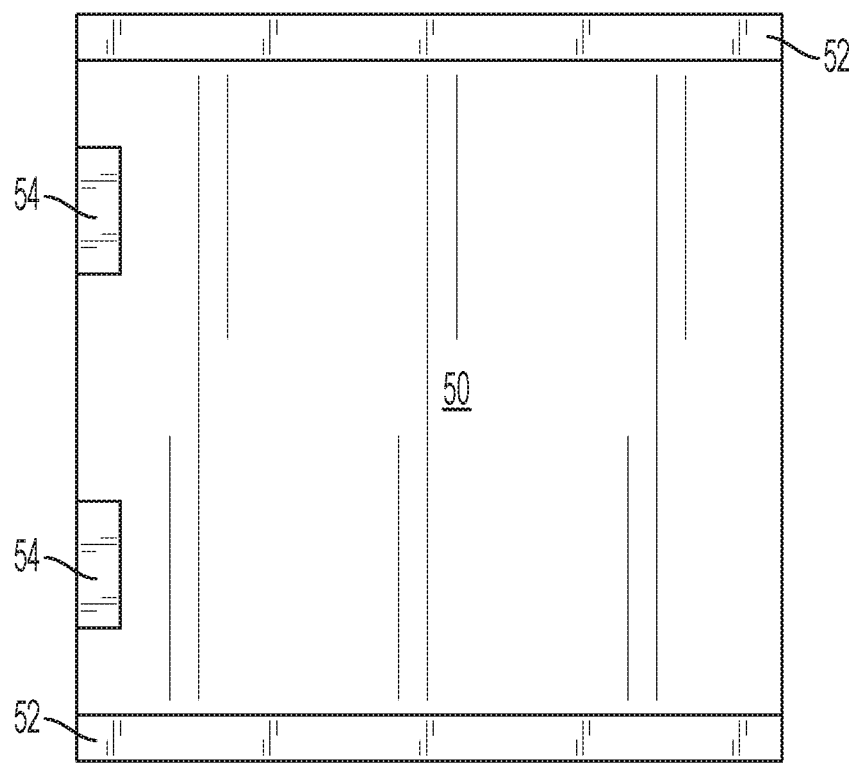
FIG. 11 is a left side view of the electric motor mount baseplate depicted in FIG. 3.
Figure 12:
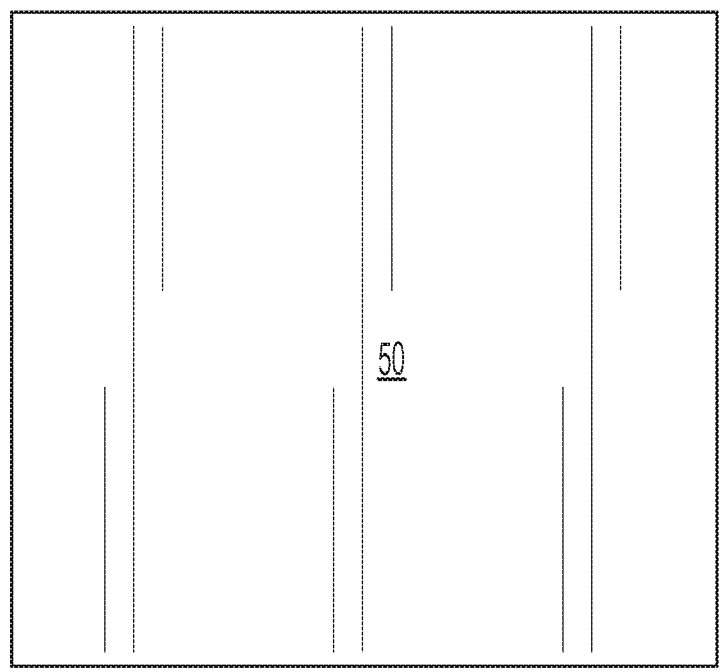
FIG. 12 is a right side view of the electric motor mount baseplate depicted in FIG. 3.

FIG. 11 is a left side view of the electric motor mount baseplate depicted in FIG. 3, while FIG. 12 is a right side view of the electric motor mount baseplate depicted in FIG. 3.

Frame 42 defines a central space 43 in which baseplate 50 is secured, as described above.

Figure 13:
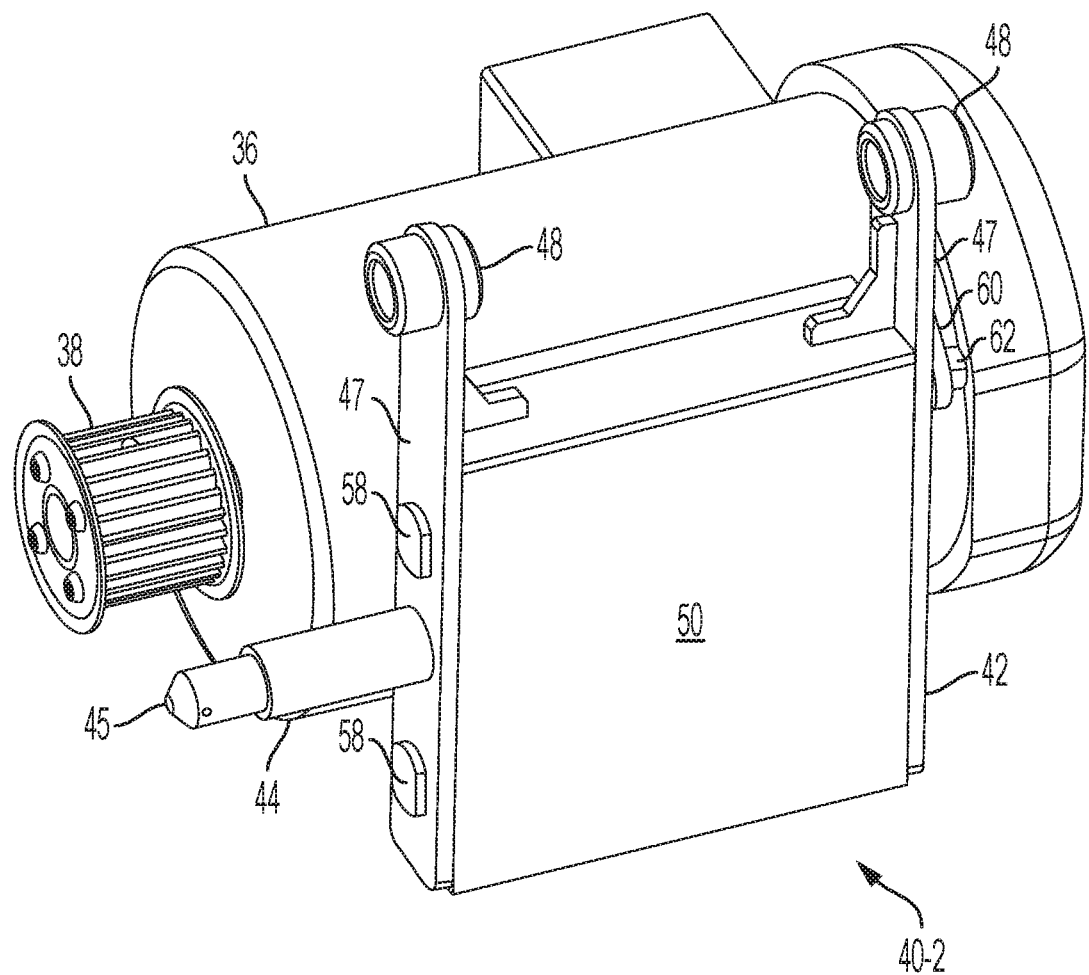
FIG. 13 is a perspective view of an electric motor mount and an electric motor in a mounted configuration, in accordance with an embodiment of the present invention.
Figure 16A:
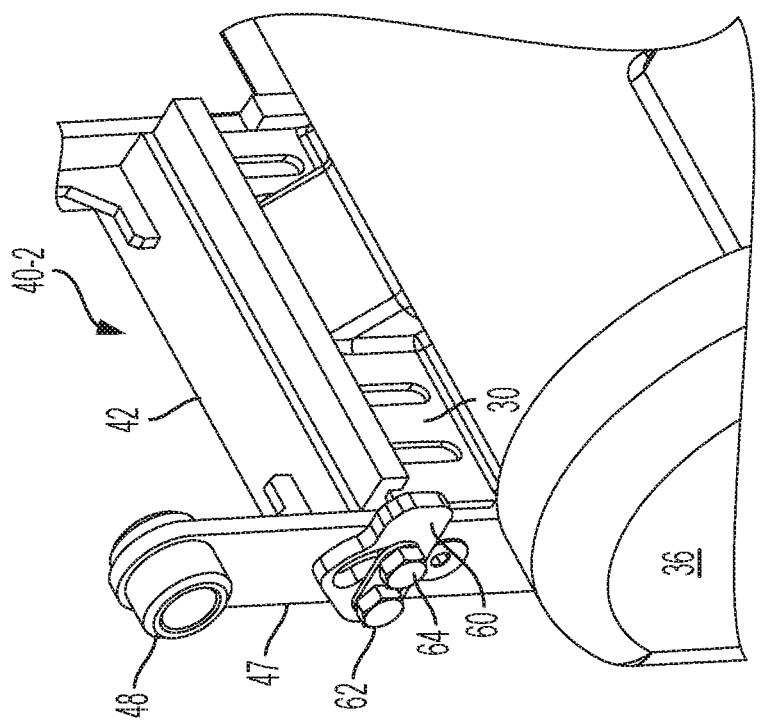
Figure 16B:
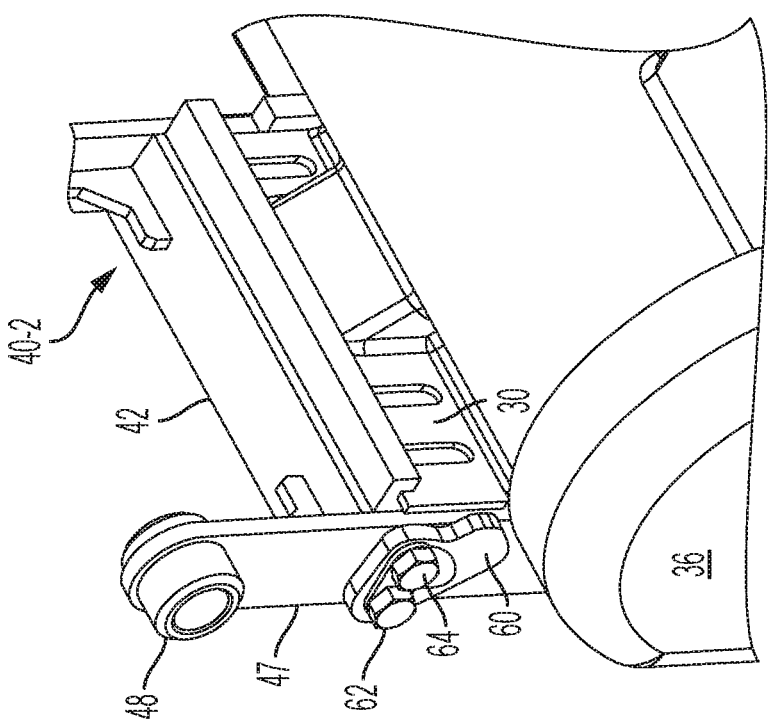
FIG. 16B depicts the latch of the electric motor mount depicted in FIG. 13 in a closed position.

FIG. 13 is a perspective view of an electric motor mount and an electric motor in a mounted configuration, in accordance with an embodiment of the present invention, while FIG. 14 is a perspective view of the electric motor mount and the electric motor depicted in FIG. 13 in a partially-mounted configuration. FIG. 15 is a sectional view of the electric motor mount depicted in FIG. 13. FIG. 16A depicts a latch of the electric motor mount depicted in FIG. 13 in an open position, while FIG. 16B depicts the latch of the electric motor mount depicted in FIG. 13 in a closed position.

When compared to electric motor mount 40-1, baseplate 50 is oriented within electric motor mount 40-2 to present guide rails 52 and guide stops 54 on the opposite or reverse side of frame 42.

The ability to removably attach baseplate 50 to frame 42 in two different orientations, combined with the ability to attach electric motor mounts 40-1, 40-2 to mounting bracket 20 in two different ways, i.e., hanging (depending) or inverted (upright), advantageously provide four different electric motor installation solutions using a single electric motor mount design, as depicted in FIGS. 1A and 1B. Additionally, after electric motor 36 has been installed on electric motor mount 40-1 or electric motor mount 40-2, adjusting the tension of belt 39 is easily accomplished by simply tightening or loosening the alignment bolt 5 on alignment rod 6, which causes electric motor mount 40-1 or electric motor mount 40-2, including drive pulley 38, to rotate about rotational coupling 26.

In an alternative embodiment, rotational couplings 26 may be locked in a fixed rotational position. In this embodiment, alignment shaft 44 and alignment rod 6 are not required, and adjusting the tension of belt 39 is accomplished by rotating electric motor mounts 40-1, 40-2 about rotational couplings 26 and then locking the rotational couplings 26 in position. The locking mechanism may include ratchets, fasteners, etc.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An electric motor mount, comprising:
   a frame, including:
   a first arm having a first bushing, and
   a second arm having a second bushing;
   a baseplate, configured to receive an electric motor foot plate, removably attached to the frame in a first orientation or a second orientation; and
   a latch, attached to a first end of the frame, to secure the electric motor foot plate to the baseplate;
   wherein the baseplate includes guide rails configured to receive the electric motor foot plate, and a guide stop against which the electric motor foot plate abuts; and
   wherein the first orientation presents the guide rails and the guide stop on a first side of the frame, and the second orientation presents the guide rails and the guide stop on a second side of the frame.

2. The electric motor mount according to claim 1, wherein the frame defines a central space in which the baseplate is disposed.

3. The electric motor mount according to claim 2, wherein the baseplate is removably attached to the frame using a mechanical fastener.

4. The electric motor mount according to claim 3, wherein the mechanical fastener extends from the first end of the frame, through the baseplate, to a second end of the frame opposite the first end of the frame.

5. The electric motor mount according to claim 1, wherein the latch includes an open position and a closed position, the open position allowing the baseplate to receive the electric motor foot plate, and the closed position preventing the electric motor foot plate from moving with respect to the baseplate.

6. The electric motor mount according to claim 1, further comprising an alignment shaft extending from a second end of the frame opposite the first end of the frame.

7. An electric motor mount, comprising:
   a frame including a first arm having a first bushing, and a second arm having a second bushing;
   a baseplate, configured to receive an electric motor foot plate, removably attached to the frame in a first orientation or a second orientation;
   a latch, attached to a first end of the frame, to secure the electric motor foot plate to the baseplate; and
   an alignment shaft extending from a second end of the frame opposite the first end of the frame;
   wherein the alignment shaft includes an end having an engagement portion and removable pin.

8. An electric motor mount system, comprising:
   a mounting bracket including:
   a tubular member,
   a first support arm, attached to the tubular member, having a first rotational coupling, and
   a second support arm, attached to the tubular member, having a second rotational coupling; and
   an electric motor mount, including:
   a frame, including a first arm having a first bushing coupled to the first rotational coupling, and a second arm having a second bushing coupled to the second rotational coupling,
   a baseplate, configured to receive an electric motor foot plate, removably attached to the frame in a first orientation or a second orientation, and
   a latch, attached to a first end of the frame, to secure the electric motor foot plate to the baseplate.

9. The electric motor mount system according to claim 8, further comprising:
   an alignment rod,
   wherein the electric motor mount includes an alignment shaft, extending from a second end of the frame opposite the first end of the frame, to engage the alignment rod, and
   wherein movement of the alignment rod rotates the electric motor mount about the first rotational coupling and the second rotational coupling.

10. The electric motor mount system according to claim 8, wherein the baseplate includes guide rails configured to receive the electric motor foot plate, and a guide stop against which the electric motor foot plate abuts.

11. The electric motor mount system according to claim 10, wherein the first orientation presents the guide rails and the guide stop on a first side of the frame, and the second orientation presents the guide rails and the guide stop on a second side of the frame.

12. The electric motor mount system according to claim 8, wherein the latch includes an open position and a closed position, the open position allowing the baseplate to receive the electric motor foot plate, and the closed position preventing the electric motor foot plate from moving with respect to the baseplate.

* * * * *